US008175848B2

(12) United States Patent  (10) Patent No.: US 8,175,848 B2
Winnebeck et al.  (45) Date of Patent: May 8, 2012

(54) DATA PROCESSING SYSTEMS AND METHODS

(75) Inventors: Jason Winnebeck, Rochester, NY (US); Michael G. Thurston, Penfield, NY (US); Christopher E. Piggot, Pittsford, NY (US)

(73) Assignee: Rochester Institute of Technology, Rochester, NY (US)

( * ) Notice: Subject to any disclaimer, the term of this patent is extended or adjusted under 35 U.S.C. 154(b) by 27 days.

(21) Appl. No.: 12/053,207

(22) Filed: Mar. 21, 2008

(65) Prior Publication Data

US 2009/0240472 A1  Sep. 24, 2009

(51) Int. Cl.
*G06F 11/30* (2006.01)
*G06F 11/00* (2006.01)

(52) U.S. Cl. ......... 702/184; 702/187; 702/188; 702/189
(58) Field of Classification Search .......... 702/181–190, 702/121–123
See application file for complete search history.

(56) References Cited

U.S. PATENT DOCUMENTS

| | | | |
|---|---|---|---|
| 2003/0004624 A1* | 1/2003 | Wilson et al. .................. 701/33 |
| 2005/0035862 A1* | 2/2005 | Wildman et al. .......... 340/573.1 |
| 2005/0088299 A1* | 4/2005 | Bandy et al. ............. 340/539.16 |
| 2007/0198144 A1* | 8/2007 | Norris et al. .................... 701/23 |
| 2007/0283002 A1* | 12/2007 | Bornhoevd et al. ........... 709/224 |

FOREIGN PATENT DOCUMENTS

| | | | |
|---|---|---|---|
| GB | 2429088 A | * | 2/2007 |
| WO | WO 2005/038613 A2 | | 4/2005 |
| WO | WO 2005038613 A2 | * | 4/2005 |

* cited by examiner

*Primary Examiner* — Phuong Huynh
(74) *Attorney, Agent, or Firm* — LeClairRyan, a Professional Corporation (57) ABSTRACT

An Asset Health Management system monitors and analyzes the health of a component of an asset. A sensor network, with one or more sensors operably coupled to an asset component, collects sensor data associated with operating characteristics of the asset component. A processing node (a System Health Node) includes one or more modules, i.e., software functions, and one or more configuration files. The processing node processes the sensor data with the one or more modules according to the one or more configuration files and determines health information corresponding to the asset component. The one or more modules receive and transmit input and output data, respectively, via data streams that organize the input and output data, e.g., according to time stamps and that may be cached. The health information may be displayed on user interfaces and/or may be transmitted over an information network to external systems.

30 Claims, 6 Drawing Sheets

DATA PROCESSING SYSTEMS AND METHODS

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No.'s N00014-03-1-0860 and N00014-05-1-0708 awarded by the Office of Naval Research.

FIELD OF THE INVENTION

This invention pertains generally to the monitoring of the health and performance of an asset, and more particularly to a system and method that determines the health of an asset by employing configurable functions that analyze data associated with selected operating characteristics where the data is collected by a sensor network and transferred between the functions in organized data streams.

BACKGROUND

Assets, such as commercial and military vehicles, ships, aircraft, generator sets, industrial equipment, and other electromechanical systems, require regular maintenance to ensure that the assets continue to function properly. Typically, these assets include critical components that are subject to a high degree of stress and/or wear, or are susceptible to failure. Accordingly, such critical components may be subject to more frequent maintenance and repair. However, the ability to implement a schedule of frequent and regular maintenance is often complicated by the fact that organizations often place very high logistical demands on these assets. Maintenance is especially difficult when such assets are deployed to remote locations and/or are required to be placed in continuous service for long periods.

A light armored vehicle (LAV) is an example of a complex electromechanical system that includes critical components. LAV's typically are 8×8 wheeled, diesel-powered, lightly armored vehicles that can be employed in a wide range of military missions. LAV's are valuable military assets due to their versatility. For example, in addition to providing other combat and combat-support functions, LAV's can transport personnel, provide a weapons platform, function as a command-and-control vehicle, and perform logistical and recovery tasks. Although LAV's can be repaired after a component fails, a reactive approach to maintenance requires unplanned downtime for the LAV. Such unplanned downtime can negatively impact execution of a military mission when the LAV is not available as expected or required by precise logistical planning. In addition, it may be difficult to prepare for, and respond effectively to, unexpected equipment failures, particularly when they occur in the field or battlefield. Even when scheduled maintenance is employed to take an LAV temporarily out of service and check the health of LAV components, the frequency of these check-ups is limited by logistical demands. As a result, problems may not be identified in time to enable preventive action and to avoid major repairs and prolonged downtime.

SUMMARY

Embodiments of the present invention provide an improved system and method that enables constant monitoring and proactive maintenance of components in an asset, such as an electromechanical system. Advantageously, the embodiments limit unplanned downtime and improve logistical planning by providing warnings as soon as problems with a component can be detected or predicted. With these warnings, corrective actions can be taken to prevent complete failure of the component and/or to prolong the service life of the asset. In some cases, because a warning can be provided well before failure, repairs and other corrective actions can be planned and logistical adjustments can be made in advance to minimize the impact of downtime. In other cases, the component has a finite operational life, but early warning enables arrangements to be made to retire and replace the asset.

Accordingly, an embodiment provides an Asset Health Management (AHM) system for determining the health, or functional condition, of a component of an asset. A sensor network, with one or more sensors operably coupled to an asset component, collects sensor data associated with operating characteristics of the asset component. A processing node, also referred to as a System Health Node (SHN), includes one or more modules, i.e., software functions, and one or more configuration files. The processing node processes the sensor data with the one or more modules according to the one or more configuration files and determines health information corresponding to the asset component. The one or more modules receive and transmit input and output data, respectively, via data streams that organize the input and output data. In addition, one or more user interfaces receive and display the health information.

In some embodiments, the one or more modules of the processing node may be written in Java code and the one or more configuration files may be XML files. In addition, one or more integrators may be employed to dynamically generate new modules allowing the processing node to be extensible. Also, the data streams may organize the input and output data according to time stamps associated with the units of data, i.e., data elements, in the input and output data. Furthermore, the data streams may be cached in a database that is accessed by the one or more modules. Additionally, a databus, such as a J1939/CAN databus, may transmit the sensor data from the sensors to the processing node and may transmit the health information from the processing node to one of the user interfaces. Also, databus drivers may be employed to enable the AHM system to communicate with different hardware implementations, e.g., interfaces, via the same type of databus. Similarly, database drivers may be employed to enable the AHM system to communicate with different types of data storage systems. Moreover, the health information may also be transmitted over an information network to one or more external systems that provide higher level processing and data reporting capabilities.

These and other aspects of the present invention will become more apparent from the following detailed description of the preferred embodiments of the present invention when viewed in conjunction with the accompanying drawings.

DETAILED DESCRIPTION

Aspects of the present invention may be employed as a part of a system, referred to herein as an Asset Health Management (AHM) system. The AHM system measures the health and performance of complex electromechanical systems. For example, AHM technology can be applied to military and non-military platforms, such as ships, aircraft, ground vehicles, and generator sets. Although AHM technology may be particularly useful on platforms with engines, the technology provides a highly configurable system and can be applied to virtually any industrial equipment.

Aspects of AHM technology represent a shift from a reactive maintenance philosophy to one of proactive maintenance. AHM technology monitors the current health of the asset or platform, reports operational information to operators and alerts them to abnormal conditions, and provides diagnostic information to platform maintainers. Additionally, AHM systems include prognostic (predictive) capabilities to predict when platform components or sub-systems will fail or require maintenance and to calculate the remaining useful life of components. Moreover, AHM technology gathers data on platform components so that component or sub-system trends and usage patterns can be viewed and analyzed. For example, data can be compared against previous platform data or against a fleet average or baseline. Mathematical or statistical methods can also be applied to the data to recognize component degradation over time, for example. AHM technology allows platform maintainers to view on-board data or to transfer data to permanent off-board storage, where it can be accessed and analyzed even when the platform is unavailable. AHM technology is also capable of transmitting logistics data to a remote location for use by maintenance and supply systems and to aid in fleet tracking. Logistics data typically includes platform location (e.g., latitude, longitude, heading, speed), state of health (e.g., abnormal condition alerts, diagnostic information), and key operating data (e.g., fuel level, ammunition level). Accordingly, embodiments of an AHM system enhance command and control effectiveness, improve maintenance and supply logistics, and reduce operations and support costs.

Figure 1:
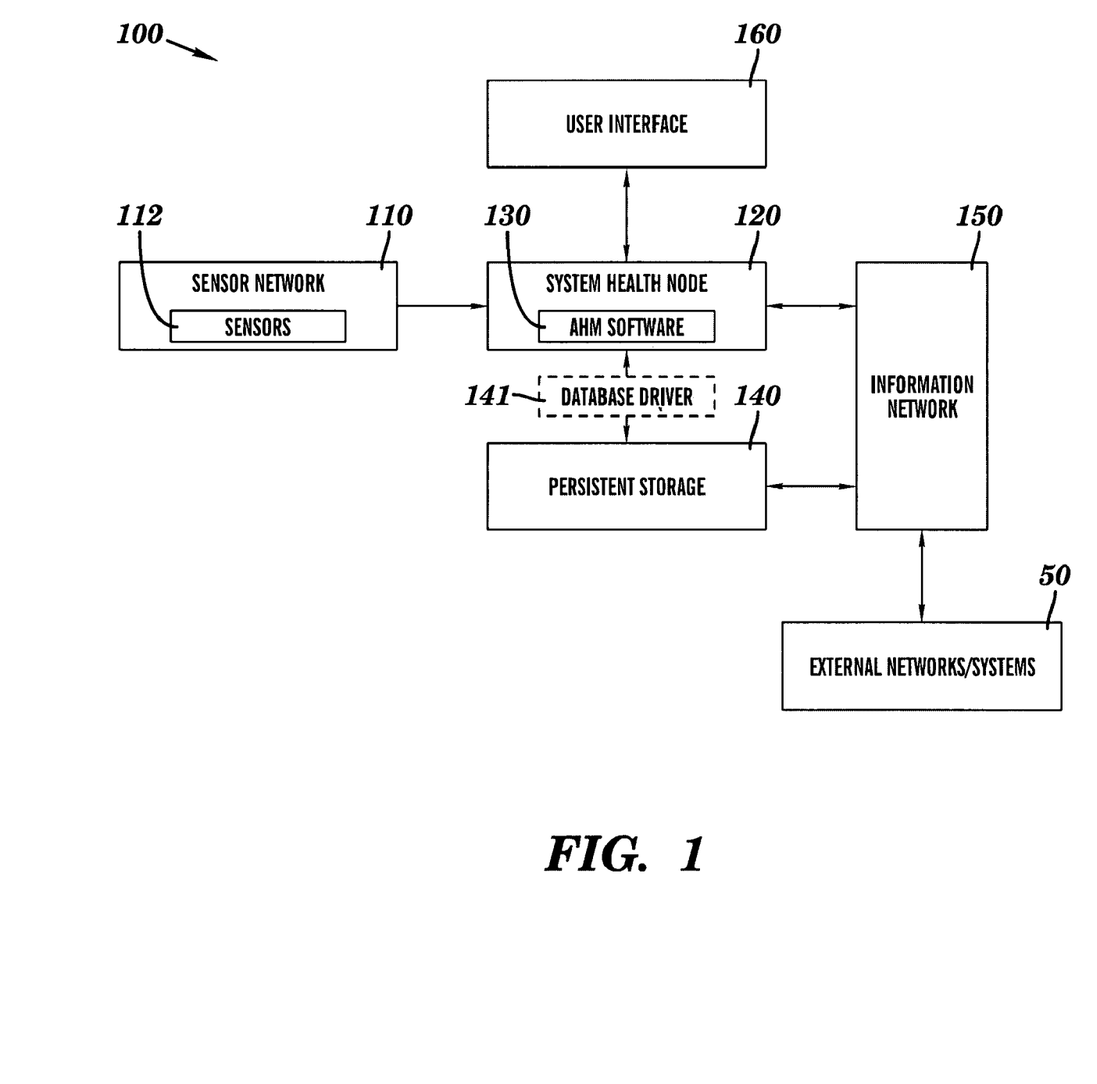
FIG. 1 illustrates a conceptual diagram of an embodiment of an Asset Health Management (AHM) system according to aspects of the present invention.

Referring now to FIG. 1, a conceptual diagram of an embodiment of an AHM system 100 is illustrated. As shown in FIG. 1, the AHM system 100 may have several basic components: a sensor network 110, a System Health Node (SHN) 120, persistent storage 140, an information network 150, and a user interface 160. The sensor network 110 includes sensors 112, such as smart sensors or the like. The sensors 112 collect data associated with certain operating characteristics, such as battery voltage, battery current, vehicle speed, component pressure, component temperature, or the like. The operating characteristics can be monitored and analyzed to determine the health of components and the host platform in general.

The data from the sensors 112 is transmitted to the SHN 120. The SHN 120 includes a central processor and information store for the AHM system 100. The SHN 120 also includes AHM software 130, which provides a framework for building health monitoring systems. The AHM software 130 runs multiple levels of data processing algorithms to identify any system anomalies and to make diagnostic and prognostic assessments for the host platform. The algorithms that make these assessments incorporate immediate sensor data, historical sensor data, and customer-driven business logic. The AHM software 130 sends and receives data via a data carrying network. In addition, data may be stored or cached by the AHM system 100 in the persistent storage 140, such as a SQL relational database. Although FIG. 1 shows that the persistent storage 140 is external to the SHN 120, it is contemplated that the persistent storage 140 may be integrated with the SHN 120. Meanwhile, the information network 150 provides external systems 50 access to the data in persistent storage 140. For example, data may be transferred from the AHM 100 to an external network or system 50 for higher level analysis and/or more permanent storage.

In addition, one or more user interfaces 160 may be employed to display sensor data as well as the diagnostic and prognostic assessments calculated by the AHM software 130. The user interfaces 160 may be on-board the platform or located off-board for remote monitoring. Moreover, although FIG. 1 shows the user interfaces 160 coupled with the SHN 120, it is contemplated that user interfaces 160 may be coupled more directly with the sensor network 110 and/or the information network 150.

Figure 2:
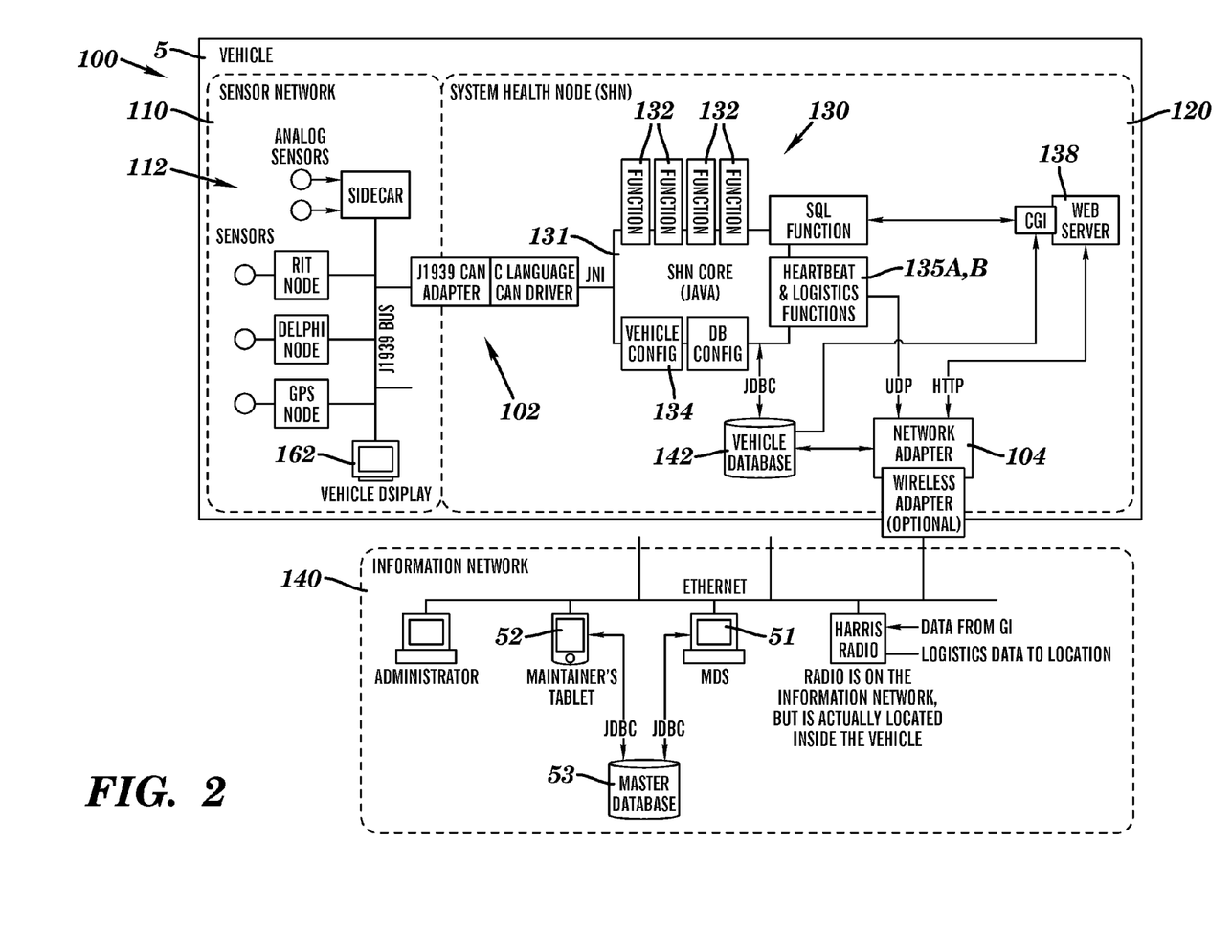
FIG. 2 illustrates further aspects of an embodiment of an AHM system according to aspects of the present invention.

FIG. 2 provides further illustration of the AHM system 100, which may be employed, for example, with a vehicle 5, such as a light armored vehicle (LAV). The sensors 112 of the sensor network 110 may be embedded throughout the vehicle 5, i.e., wherever operating characteristics of interest can be measured. For example, sensors 112 may be positioned in the vicinity of wheel planetaries and differentials in a LAV to collect temperature data which indicates the health of the wheel planetaries and differentials. Due to the mobility and versatility required from an LAV, the wheel planetaries and differentials are critical to the operation of the LAV. In the particular case of wheel planetaries, differentials, and other components outside the hull of the LAV, wireless sensors may be employed. The sensors, for example, may be based on the IEEE 802.15.4 standard which specifies the physical layer and medium access control for low-rate wireless networks. As such, the AHM system 100 can collect data from the sensors 112 wirelessly as well as via a hard-wired network.

Figure 3:
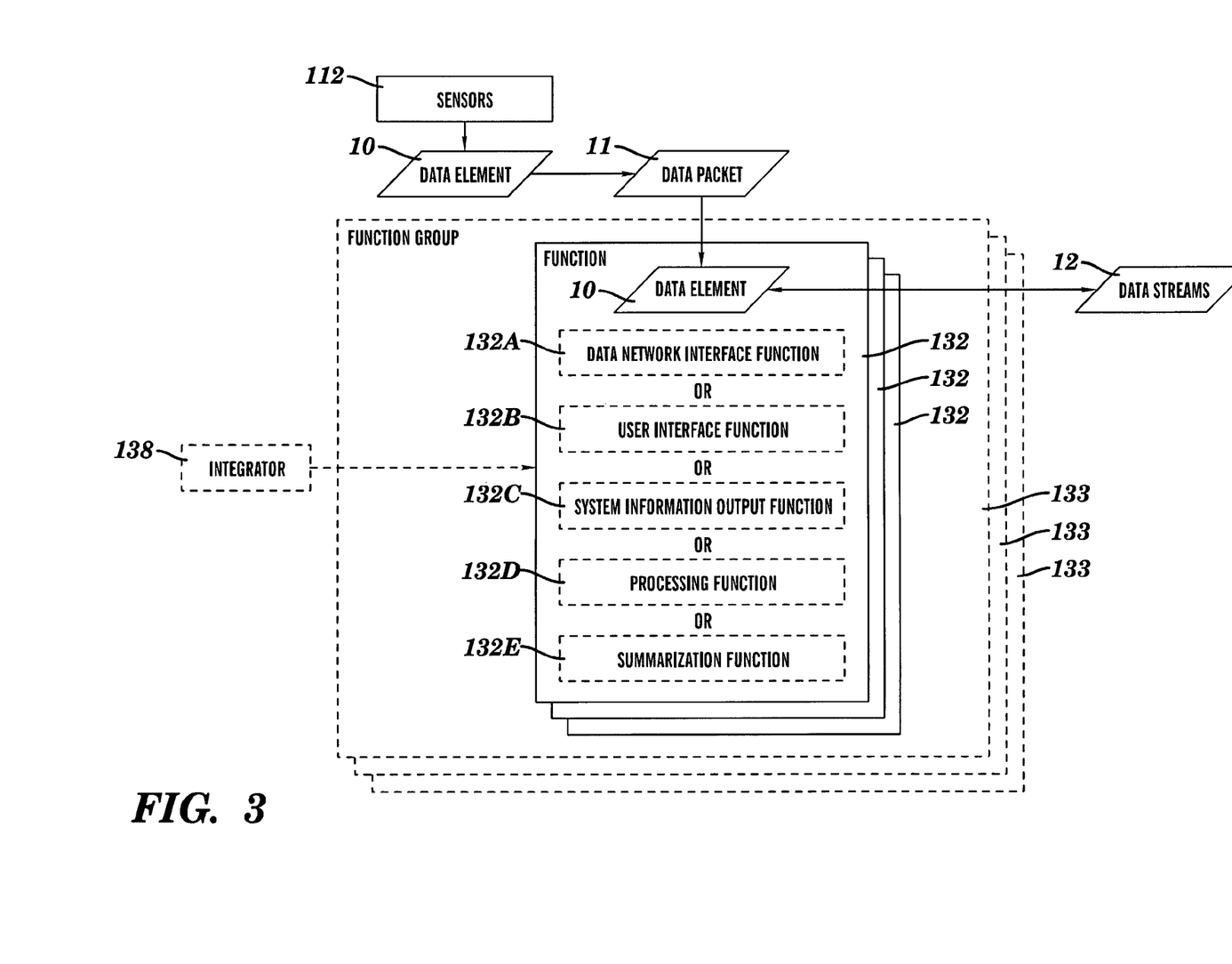
FIG. 3 illustrates the flow of data in an embodiment of an AHM system according to aspects of the present invention.

FIG. 3 illustrates the flow of data from the sensors 112. As shown in FIG. 3, units of data, or data elements, 10 from the sensors 112 are encapsulated in data packets 11. These data packets can be broadcast over a databus 102 to the SHN 120, as illustrated in FIG. 2. The databus 102, for instance, may be a J1939/CAN bus, where J1939 refers to a vehicle databus standard used defined by the Society of Automotive Engineers (SAE) for communication and diagnostics and CAN (controller area network) refers to a databus physical specification defined by ISO 11898. If transmission occurs over a J1939/CAN bus, the packets 11 are defined by the J1939 standard.

Referring again to FIG. 2, the AHM software 130 of the SHN 120 consists of a core software framework 131 which includes functions or modules 132 to extract data elements 10 from the packets 11 and to process the data elements 10. A function or module 132 is a configurable software component that performs a processing task on input data elements 10 and typically generates output data elements 10.

Configuration files 134 are employed to define the types of functions that are needed for a particular application of the AHM system 100. Such configuration files 134, for example, may be XML-based. When the AHM software 130 is executed, a program reads a set of configuration files 134 to determine which elements of the overall software functionality are required for the desired application. The inputs and outputs of each function 132 are also specified in the configuration files 134. In this way, the resource requirements of the software application 130 are determined from the required functionality.

The configuration files 134 also reference drivers for communications to and from the AHM system 100. Databus drivers may be employed to enable the AHM system 100 to communicate with different hardware implementations, e.g., interfaces, via the same type of databus 102. For example, with these databus drivers, the AHM system 100 can communicate with a variety of systems by reading and writing to a SAE J1939 databus or a SAE J1708/J1587 databus. In general, the AHM system 100 can interact with different hardware or operating systems by writing to a driver, obtaining data from a file to simulate a databus, and/or obtaining data from a remote source (databus network bridge).

In addition, as illustrated in FIG. 1, a database driver 141 may be referenced by configuration files 134 to enable the AHM system 100 to communicate with different types of database software implementations for persistent storage 140. Advantageously, the database driver 142 provides a layer of abstraction for communications with the persistent storage 140. For example, the database driver 141 does not assume, nor does it require, a SQL relational database. As such, the database driver 141 can also write data to flat files, such as comma separated value (CSV) files, or other non-SQL, non-relational databases.

As also shown in FIG. 2, the AHM system 100 can store the data elements 10 in a vehicle database 142. As such, the data elements 10 can persist permanently. The database schema allows the data stored within the vehicle database 142 to be easily transformed to a form that is compliant, for example, with the MIMOSA data exchange standard for monitoring machinery. Data structures in the vehicle database 142 may include trend data, cumulative summary data tables, and usage data tables. The data structures may also allow for the capture of windows of data based on particular data capture event conditions. Furthermore, the data structures may enable high bandwidth data to be transformed into lower bandwidth summary data as the data storage system 142 approaches capacity. As such, the maximum size of the data storage system 142 can be maintained by deleting the oldest high bandwidth data after it is summarized as low bandwidth summary data.

As shown in FIG. 3, data elements 10 may be further inserted into a data stream 12, which is a time-ordered collection of data elements 10. Each data element 10 in a data stream 12 is time stamped. As such, the data stream 12 can be interpreted as a continuous view of the operating characteristic being measured or analyzed. In general, each data stream 12 is associated with one source or one writer of data associated with an operating characteristic. Moreover, data elements 10 written to a data stream 12 may be cached in memory for future storage as well as access by other parts of the AHM system 100.

The AHM system 100 manages the transfer of the data elements 10 between functions 132 via data streams 12. The inputs and outputs of the functions 132 are connected to data streams 12, which are used as channels for the data. One writer can distribute data to a single data stream 12 which then provides input to other multiple functions 132. In other words, the functions 132 output their data (calculated or transformed from the databus 102) to a data stream 12, which is stored in the database 142 by the AHM system 100. As described previously, the AHM system 100 may employ a database driver 141 to communicate with the database 142. The database driver 141 provides an abstraction that can map to different types of persistent storage systems 140 storing the data organized in data streams 12. Although embodiments described herein may employ a persistent storage 140 for handling data streams 12, it is contemplated that in alternative embodiments, the AHM system 100 can run without a writable database to restrict the AHM system 100 to real-time use only.

The data streams 12 are also used as a form of communication between functions 132, allowing a processing function 132 to read one or more streams 12 and produce a higher-level calculated result. As such, the generic system for managing data as streams 12 of time sequence data forms a basis of data storage and communication in the AHM system 100.

In sum, the AHM software 130 may be configured by writing functions 132 in Java code or the like, and the data flow is described by an XML document that specifies the functions 132 and their inputs and outputs. Inputs and outputs may be packets 11 sent via on-board or off-board communication channels, or they may be data elements 10 sent via data streams 12. The caching of the data and the processing of a directional data flow defines the functions 132 to be implemented as online algorithms. Even though there are no event deadlines, the AHM system 100 may be considered to be a "real-time" system in some aspects as data can be processed as soon as it arrives.

As FIG. 3 also illustrates, function types 132 may include, without limitation: data network interface functions 132A, user interface functions 132B, system information output functions 132C, processing functions 132D, and summarization functions 132E. Data network functions 132A read data in proprietary or standard form from different types of databus networks 102, such as SAE J1939 or SAE J1708/J1587, and write out the data for use by other AHM functions 132. User interface functions 132B send data in the appropriate format over a variety networks, such as SAE J1939 or an Ethernet network, to a user interface 160 for display. System information output functions 132C send data to the external systems 50 over the information network 150, such as Ethernet or cellular networks, or provide an interface for external systems 50 to request data. Processing functions 132D read multiple pieces of data from within the AHM system 100, process the data to generate higher level diagnostic system information, and then writes out the data for use by other functions 132. The processing functions 132D can be specially designed to execute specific types of computations or processing. Summarization functions 132E calculate usage data (histograms), trend information (statistical summaries), and cumulations (aggregate counters) from existing data stream(s) 12.

As also illustrated in FIG. 3, the functions 132 may be grouped into function groups 133, which can be scheduled for execution using different algorithms. The functions 132 can be run on a polled basis (time driven) or a continuous basis (event driven). The function groups 133 may form a parallel computing system, and processing priorities can be assigned. The AHM core software framework 131 provides the time management needed to synchronize these parallel tasks and is able to distinguish processing time (when data is calculated) from data time (when data corresponds to the physical system). The AHM system 100 can control the apparent time for functions 132 so that the functions 132 can appear to execute instantaneously or can run data processing retroactively.

Advantageously, the AHM system 100 is extensible. Specifically, the core software framework 131 allows the loading and execution of additional software functions 132. As such, FIG. 3 illustrates that a function 132 may be generated by an integrator 138. Integrators 138 can write and compile new functions without re-compiling or re-linking the AHM core software 131 or the existing functions 132. As such, the AHM software 130 can be easily adapted to provide health monitoring for many different kinds of platforms. Integrator-created functions 132 may be used particularly for the processing functions 132D described previously. The configuration files 134 allow integrators 138 to choose which functions to run and to specify how they run through the use of scheduling algorithms and function initialization parameters. As indicated previously, the AHM core software 131 and all integrator-created functions 132 may be implemented in a software language, such as Java, that is interpreted at run-time. Once a function 132 is written, compiled, and implemented by the core framework 131, the function 132 is included in a set of functions 132 that can be reused in specific configurations of the AHM system 100.

FIG. 2 also shows that the SHN 120 may include a heartbeat function 135A and a logistics function 135B. The heartbeat function 135A broadcasts heartbeat packets via a network interface, e.g., an Ethernet network adapter 104, to the network 150, so that external systems 50 may identify and locate the vehicle 5. Meanwhile, the logistics function 135B broadcasts logistics data using a radio or other network 150 to external systems 50, such as remote maintenance and support facilities. Therefore, while the AHM system 100 can read and write to the J1939/CAN databus 102 for on-board communications, the AHM system 100 can also read and write to a UDP/IP and TCP/IP network for off-board communications.

FIG. 2 also shows a vehicle display 162 which can display the health information determined by the functions 132. For example, the vehicle display 162 may be an on-board driver's display panel. In particular, the vehicle display 162 may be a simple text-only display module on the databus 102 that the SHN 120 uses to report informational text messages to the vehicle operator about the vehicle status or error conditions. For instance, the display 162 may include a 2-line×20-character dot matrix LED display, which can show an alphanumeric message of up to 40 characters. The display 162 may be J1939 compliant and may employ a custom J1939 message format including an alert identification, an alert state, and specific data values. The display 162 may also include indicator lights that are used to indicate the operational status of the vehicle, e.g., green for normal operation, yellow for degraded functionality, and red for nonfunctional. In addition to the specific user interfaces 160 described herein, other appropriate user interfaces 160 may be employed to display data or receive requests for information from operators, maintainers, and the like.

The SHN 120 can also include hard-wired and wireless (WiFi) Ethernet interfaces 123 for transmitting as well as retrieving data. As further illustrated in FIG. 2, a web server 128 on the SHN node 120 may provide an interface to external systems 50 through the Ethernet network adapter 104. The web server 128 can use the network interface 104 to service requests from external systems 50, such as a Maintenance Data Synchronizer (MDS) 51 and a Maintainer's Application 52. The MDS 51 detects the vehicle 5, in addition to other vehicles, by the heartbeat packets from heartbeat function 135A and downloads any newly collected data from the onboard vehicle database 142 to a master database 53. The master database 53 contains long-term information on many vehicles 5, so that vehicle maintainers can examine long-term history even when vehicles are in service in the field. The Maintainer's Application 52 accesses a vehicle's history through the network interface, and may display graphs and charts of sensor data, as well as track any anomalies, alerts, or events that occur when the vehicle is in service or out on a mission. Although specific examples are shown in FIG. 2, other external systems 50 with a variety of user interfaces may be employed to provide higher level analysis, additional data storage, and/or data display and reporting capabilities.

Figure 4:
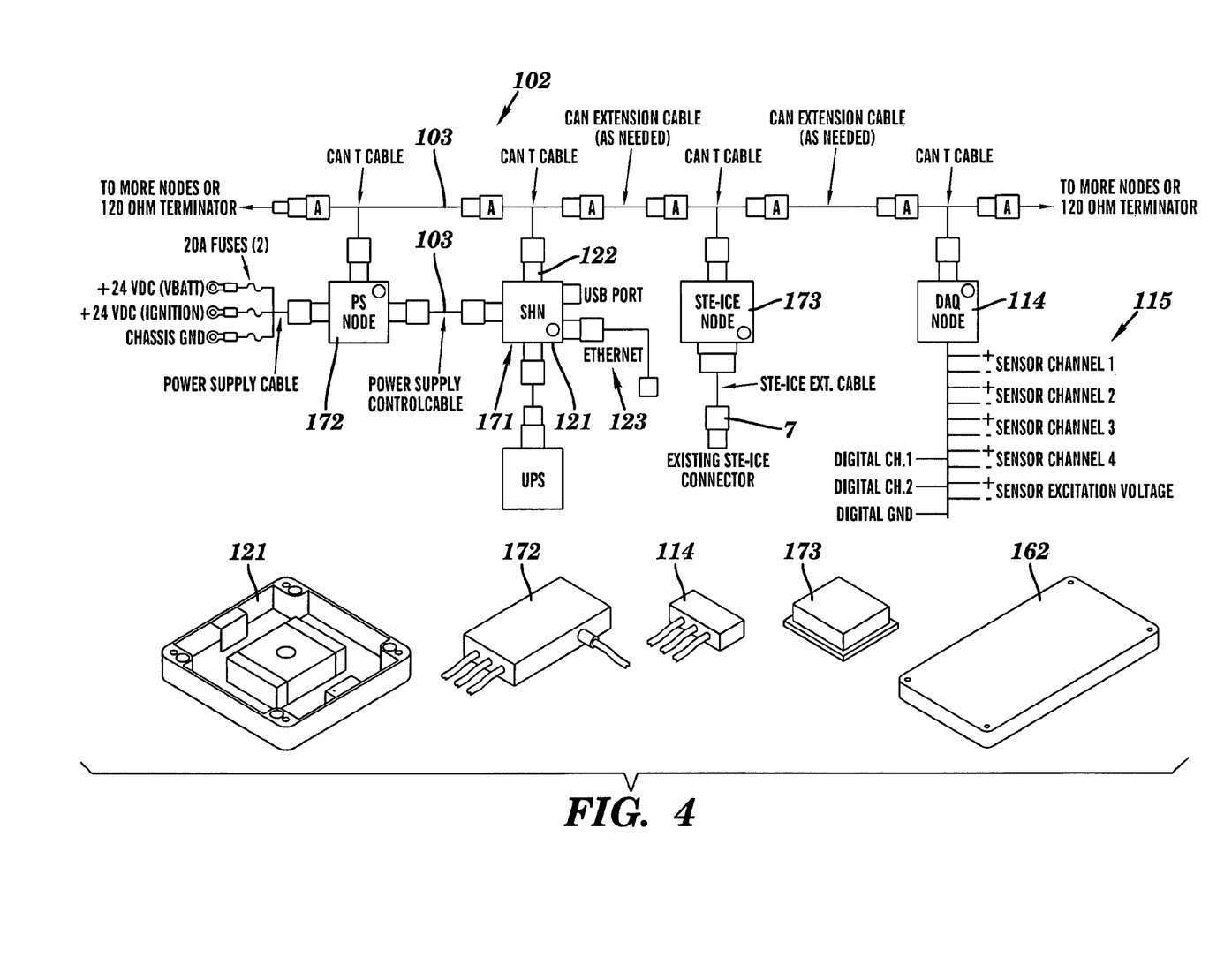
FIG. 4 illustrates an example hardware configuration of an embodiment of an AHM system according to aspects of the present invention.

Hardware components for an embodiment of the AHM system 100 as employed in a vehicle 5 are further illustrated in FIG. 4. As described previously, on-board components of the AHM system 100, such as the sensor network 110 and the SHN 120, may communicate using a J1939 compatible databus 102. As shown in FIG. 4, a cable 103 provides bus communication as well as distributed power for these components.

As FIG. 4 illustrates, the hardware for the SHN 120 includes a processing unit (CPU) 121 with on-board RAM capable of supporting the required storage, diagnostic, and prognostic algorithms. The SHN 120 also includes a CAN interface 122 for receiving data from the sensor network 110 and for transmitting health information to on-board user interfaces, such as the driver's display panel 162 described previously with reference to FIG. 2.

The hardware components of the AHM system 100 may also include a PC/104 power supply 171 which has an off-the-shelf DC-DC converter mounted on a proprietary circuit board. The circuit board provides an integrated high-side switch that allows power drawn from the vehicle battery to flow to the DC-DC converter (and thus the CPU stack) as soon as the master switch is enabled. The circuit board also provides programmable logic, for example, in the form a hardware state machine programmed via a complex programmable logic device (CPLD). The programmable logic keeps power flowing to the CPU stack even in the absence of the master switch, taking power directly from the vehicle battery input. Additionally, a digital timer cuts off power and reduces current flow to micro amps, allowing the SHN 120 to have a very low quiescent current in order to preserve charge on the main vehicle battery. Furthermore, a PC/104 bus provides a communications path for communicating power supply and switch status to the CPU 121 and allows the CPU 121 to signal when it has safely shut down so that main power can be cut off. The PC/104 power supply 171 acts similar to an uninterruptible power supply (UPS), although it uses the vehicle battery as both the main and backup power source. Alternatively, a small battery or capacitor bank can act as the "backup" power source in situations where vehicle power may be disconnected suddenly.

Intelligent power control also provides a "gentle" system power-on and power-off. As FIG. 4 illustrates further, a centralized power supply and conditioner 171 feeds the databus 102 via cable 103. The power supply 172, in contrast to the PC/104 power supply 171, powers the entire databus, including data acquisition nodes and some vehicle sensors. The power supply 172 includes two logical stages: a buck converter that pre-regulates the input power, followed by the main DC-DC converter. The pre-regulator removes high voltage spikes such as load-dump transients. The power supply 172 may be designed to address the stringent requirements of MIL STD 1275 and SAE J1455, and also provides a fast response to transient events. The main DC-DC converter provides +9V, −9V, and +24V for all databus components, including the SHN 120.

As shown in FIG. 4, the CAN bus architecture 102 allows the SHN 120 to communicate with data acquisition node 114 described below and human interface devices, such as the vehicle display 162 described previously. Advantageously, the design of the CAN bus 102 can distribute communications and data acquisition node power in the same cable 103. The cable 103 includes separate shielded sections for communications and power, and multiple grounds to allow for fully isolated CAN and power if needed.

The data acquisition node (DAQ) 114 is a device that samples input voltages from any kind of sensor 112 over sensor channels 115. As described previously, the input voltages from the sensors provide operating characteristic data, such as battery current, vehicle speed, component pressure, component temperature, and the like. The DAQ node 114 may be J1939 compliant and may report the collected information in the form of CAN bus messages. The DAQ node 114 includes a digital signal processor that may perform additional processing of this data before reporting it. This processing may include filtering and averaging, time and frequency domain analysis, and sensor fault detection and testing. The DAQ node 114 is a general-purpose device intended to be connected to most types of sensors normally found on vehicles, ships, aircraft, industrial equipment, and the like. The DAQ 114 can be reprogrammed "in-system" over the CAN bus 103.

As discussed previously, the AHM system 100 may be employed on military platforms, such as a LAV. In such cases, a special data acquisition device, referred to as a STE-ICE module 173, may be employed for the Diagnostic Connector Assembly (DCA) interface 7 on most U.S. military ground vehicles, such as a LAV or a high mobility multipurpose wheeled vehicle (HMMWV). The STE-ICE module 173 periodically samples analog signals from the DCA. The STE-ICE module 173, like the DAQ node 172, includes a digital signal processor. The STE-ICE module 173 may be J1939 compliant, and programming over the CAN bus may also be available on the STE-ICE module 173. The inputs monitored with the STE-ICE module 173 may include, without limitation: battery voltage, battery current, air box pressure, starter volts, fuel pressure, fuel filter pressure, pulse tachometer, fuel return pressure, alternator field, alternator current, turbo pressure, starter solenoid, and/or air cleaner pressure.

Figure 5:
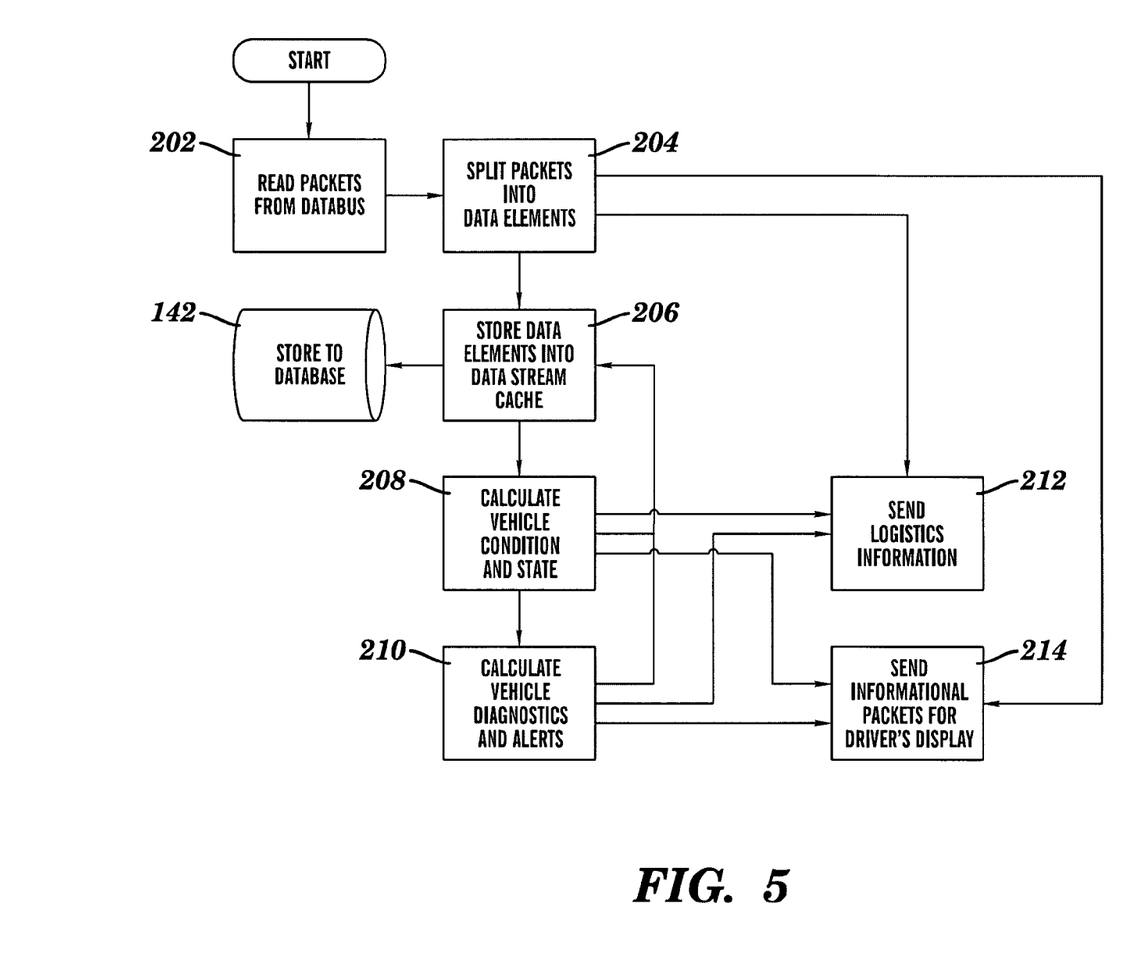
FIG. 5 illustrates steps for employing an embodiment of an AHM system according to aspects of the present invention.

FIG. 5 illustrates exemplary operation of the AHM system 100 described previously. As shown in FIG. 5, a function, such as the data network interface function 132A shown in FIG. 3, reads and collects packets 12 from a databus 102 in step 202. The packets 12 may be communicated over the databus 102 by the sensors 112. The function then extracts data elements 10 from the collected packets 12, in step 204. In step 206, the extracted data elements 10 are inserted into a data stream 12 and then cached in a database 142. As described further below, step 206 may be repeated to cache data elements 10 from other functions 132 in data streams 12 as further means of communicating data.

In step 208, the data elements 10 are passed to another function, such as the processing function 132D shown in FIG. 3, which determines the vehicle condition and state. The data elements 10 associated with the vehicle condition and state calculated in step 208 can be inserted into a data stream 12 and cached in a database 142 in step 206.

In step 210, the calculated data elements 10 associated with the vehicle condition and state from step 208 are passed to another processing function that generates alerts and diagnostics information. The generated data elements 10 from step 210 indicate system failures and provide information about the failures. The data elements 10 associated with the alerts and diagnostic information can be inserted into a data stream 12 and cached in a database 142 in step 206.

In sum, the data elements 10 from step 204 include input data collected from the sensors 112. The output data elements 10 from step 208 include data associated with the vehicle condition and state. Meanwhile, the output data elements 10 from step 210 include alerts and diagnostics information. In step 212, the data elements 10 from steps 204, 208, and/or 210 are received by a function, such as the system information output function 132C, which sends packets 11 for on-board (databus) or off-board (UDP/IP) communication. In step 214, the data elements 10 from steps 204, 208. and/or 210 are received by a function, such as the user interface function 132B, which sends packets for on-board informational display, such as the driver's console 162.

Figure 6:
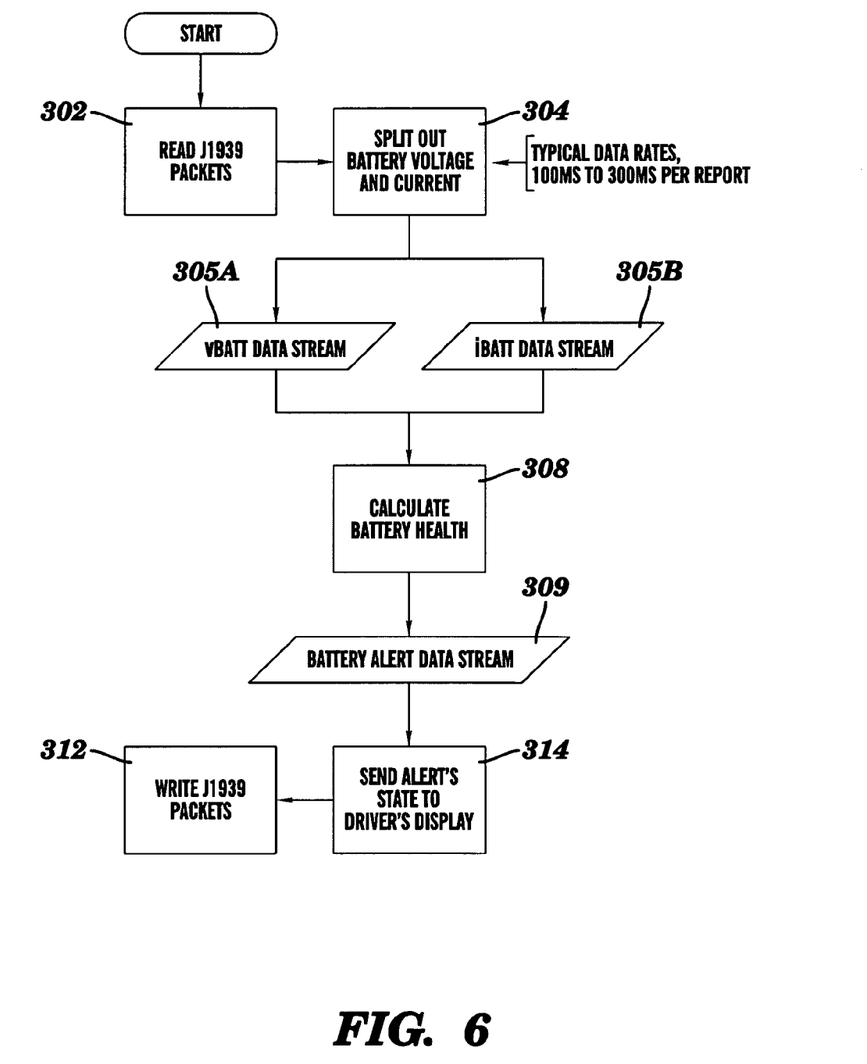
FIG. 6 illustrates a further example of steps for employing an embodiment of an AHM system according to aspects of the present invention.

As a further example, FIG. 6 illustrates operation of an AHM system 100 that monitors the battery health of a vehicle 5. In step 302, a function 132 reads the packets 11 transmitted over a J1939 databus 102. The packets 11 contain data elements 10 associated with battery voltage and current data. In step 304, another function 132 extracts these data elements 10 from the packets 11 and inserts them into data streams 305A and 305B corresponding to voltage and current data, respectively. A further function 132 in step 308 receives the data elements 10 from the data streams 305A and 305B to calculate the battery health. Step 308 thus produces data elements 10 which are inserted into a battery alert data stream 309. The battery alert data may be produced by another function 132 (not shown) that generates alert data from the battery health calculated in step 308. A function 132 in step 314 communicates the alert data in the data stream 309 to a driver's display 162 (not shown). In step 312, the alert data may also be communicated as packets 11 via the J1939 databus 102.

Accordingly, embodiments of the present invention provide an improved system and method that enables constant monitoring and proactive maintenance of components in an asset. Advantageously, the embodiments limit unplanned downtime and improve logistical planning by providing warnings as soon as problems with a component can be detected or predicted. With these warnings, corrective actions can be taken to prevent complete failure of the component and/or to prolong the service life of the electromechanical system. In some cases, because a warning can be provided well before failure, repairs and other corrective actions can be planned and logistical adjustments can be made in advance to minimize the impact of downtime. In other cases, the component has a finite operational life, but early warning enables arrangements to be made to retire and replace the asset.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

What we claim is:

1. A system for determining the health of a component of an asset, comprising:
 a sensor network including one or more sensors operably coupled to an asset component and collecting sensor data associated with at least one or more operating characteristics of the asset component;
 a processing device including one or more modules and one or more configuration files, the processing device configured to
  read the one or more configuration files,
  receive the sensor data encapsulated in data packets,
  extract from the data packets at least one or more units of sensor data associated with a first operating characteristic of the asset component and at least one or more units of sensor data associated with a second operating characteristic of the asset component, and insert the extracted units of sensor data associated with the first operating characteristic of the asset component into a first data stream associated with the first operating characteristic of the asset component and insert the extracted units of sensor data associated with the second operating characteristic of the asset component into a second data stream associated with the second operating characteristic of the asset component based upon the one or more configuration files and determining health information associated with the asset component, wherein the one or more modules receiving and transmitting input and output data from the extracted units of sensor data, via the data streams to organize the input and output data; and one or more user interfaces receive and display a data stream associated with the determined health information.

2. The system according to claim 1, wherein the data streams organize the input and output data according to time stamps associated with the units of sensor data in the input and output data.

3. The system according to claim 1, wherein the data streams are cached in a database that is accessed by the one or more modules.

4. The system according to claim 1, wherein the processing device communicates with the database via a database driver, the database driver permitting the processing device to communicate with a plurality of database types.

5. The system according to claim 1, further comprising one or more integrators that generate new modules, thereby allowing the processing device to be extensible.

6. The system according to claim 1, wherein one of the modules is compatible with a plurality of network protocols and reads the transmitted input data according to one of network protocols and writes the output data usable by other modules.

7. The system according to claim 1, wherein one of the modules is compatible with a plurality of network protocols and sends the health information from the processing device to one of the user interfaces according to one of the network protocols.

8. The system according to claim 1, wherein one of the modules sends data over an information network to one or more external systems.

9. The system according to claim 1, wherein one of the modules is a processing module that determines a state for the asset component.

10. The system according to claim 9, wherein one of the modules is a processing module that generates alert information based on the state of the asset component.

11. The system according to claim 1, wherein one of the modules summarizes the input data by determining at least one of usage data, trend information, and cumulations.

12. The system according to claim 1, wherein the one or more modules are written in Java code and the one or more configuration files are XML files.

13. The system according to claim 1, further comprising a databus that transmits the sensor data to the processing device and the determined health information from the processing device to one of the user interfaces.

14. The system according to claim 13, wherein the databus is a J1939/Controller Area Network (CAN) databus or a J1708/J1587 databus.

15. The system according to claim 1, further comprising a databus and a databus driver, the database driver permitting the processing device to communicate with a plurality of system types via the databus.

16. A method for determining the health of a component of an asset, comprising:

receiving, from a sensor network, sensor data associated with operating characteristics of an asset component, the sensor network including one or more sensors operably coupled to the asset component;

processing the sensor data and determining, by a computer, health information associated with the asset component, including reading one or more configuration files;

receiving the sensor data encapsulated in data packets;

executing one or more modules comprises extracting at least one or more units of sensor data from the data packets associated with a first operating characteristic of the asset component and at least one or more units of sensor data associated with a second operating characteristic of the asset component;

inserting the extracted units of sensor data associated with the first operating characteristic of the asset component into at least a first data stream associated with the first operating characteristic of the asset component and inserting the extracted units of sensor data associated with the second operating characteristic of the asset component into at least a second data stream associated with the second operating characteristic of the asset component based upon the one or more configuration files and determining health information associated with the asset component;

executing the one or more modules based upon the one or more configuration files; and communicating input and output data to and from the one or more modules via the data streams to organize the input and output data from the extracted units of sensor data; and communicating, by the computer, the determined health information to one or more user interfaces.

17. The method according to claim 16, wherein the step of communicating input and output data via data streams comprises organizing the input and output data according to time stamps associated with the extracted units of sensor data in the input and output data.

18. The method according to claim 16, wherein the step of communicating input and output data via data streams comprises caching the data streams in a database that is accessed by the one or more modules.

19. The method according to claim 18, wherein the step of caching the data streams in a database comprises communicating with the database via a database driver, the database driver permitting communications with a plurality of database types.

20. The method according to claim 16, wherein the step of processing the sensor data and determining health information further comprises generating new modules by implementing one or more integrators.

21. The method according to claim 16, wherein the step of executing one or more modules comprises reading the transmitted input data according to one of a plurality of compatible network protocols and writing the output data usable by other modules.

22. The method according to claim 16, wherein the step of communicating the health information comprises sending the health information to one of the user interfaces according to one of a plurality of compatible network protocols.

23. The method according to claim 16, further comprising sending data over an information network to one or more external systems.

24. The method according to claim 16, wherein the step of executing one or more modules comprises determining a state for the asset component.

25. The method according to claim 24, wherein the step of executing one or more modules comprises generating alert information based on the state of the asset component.

26. The method according to claim 16, wherein the step of executing one or more modules comprises summarizing input data by determining at least one of usage data, trend information, and cumulations.

27. The method according to claim 16, wherein the one or more modules are written in Java code and the one or more configuration files are XML files.

28. The method according to claim 16, wherein the steps of receiving sensor data and communicating the health information comprise implementing a databus.

29. The method according to claim 28, wherein the databus is a J1939/Controller Area Network (CAN) databus or a J1708/J1587 databus.

30. The method according to claim 16, further comprising the step of communicating data via a databus driver, the databus driver permitting communications with a plurality of system types via a databus.

\* \* \* \* \*

UNITED STATES PATENT AND TRADEMARK OFFICE
CERTIFICATE OF CORRECTION

PATENT NO. : 8,175,848 B2  
APPLICATION NO. : 12/053207  
DATED : May 8, 2012  
INVENTOR(S) : Jason Winnebeck, Michael Thurston and Christopher Piggott It is certified that error appears in the above-identified patent and that said Letters Patent is hereby corrected as shown below:

Cover Page

At (75), line 3, delete the following sentence:

"(US); Christopher E. Piggot, Pittsford,"

and insert the following sentence in its place:

--(US); Christopher E. Piggott, Pittsford,--

Signed and Sealed this  
Eighteenth Day of September, 2012

David J. Kappos  
*Director of the United States Patent and Trademark Office*